(12) United States Patent
Patwardhan

(10) Patent No.: US 7,535,862 B2
(45) Date of Patent: May 19, 2009

(54) RATE ADAPTIVE DATA BROADCAST TECHNIQUE

(76) Inventor: Niket Keshav Patwardhan, P.O. Box 675, Santa Clara, CA (US) 95052

( * ) Notice: Subject to any disclaimer, the term of this patent is extended or adjusted under 35 U.S.C. 154(b) by 234 days.

(21) Appl. No.: 10/533,658

(22) PCT Filed: Apr. 21, 2004

(86) PCT No.: PCT/US2004/012339

§ 371 (c)(1),
(2), (4) Date: May 5, 2005

(87) PCT Pub. No.: WO2004/095757

PCT Pub. Date: Nov. 4, 2004

(65) Prior Publication Data

US 2006/0133305 A1    Jun. 22, 2006

Related U.S. Application Data

(60) Provisional application No. 60/465,096, filed on Apr. 23, 2003.

(51) Int. Cl.
*H04H 20/71* (2008.01)

(52) U.S. Cl. .................. 370/312; 370/432; 370/474; 370/477; 370/542

(58) Field of Classification Search ............. 370/474, 370/312, 432, 477, 542
See application file for complete search history.

(56) References Cited

U.S. PATENT DOCUMENTS

| 3,916,095 | A  | * | 10/1975 | Weber et al. | 358/426.08 |
| 5,966,377 | A  | * | 10/1999 | Murai | 370/342 |
| 6,912,247 | B2 | * | 6/2005  | Miyashita et al. | 375/228 |
| 2002/0122465 | A1 | * | 9/2002 | Agee et al. | 375/141 |

* cited by examiner

*Primary Examiner*—Seema S Rao
*Assistant Examiner*—Sai-Ming Chan

(57) ABSTRACT

This invention describes a novel digital broadcast modulation scheme to provide wide area coverage at a high bit rate from a single transmitter. The scheme creates an additional dimension within which to create transmission channels besides those of time, code, direction and frequency. Advantages of scheme include lower power to deliver the same total bit rate to an area, wider coverage using the same power, and closer spacing of transmitters sharing the same frequencies. It is particularly well suited to supporting broadcast of data to a large population of users.

4 Claims, 1 Drawing Sheet

RATE ADAPTIVE DATA BROADCAST TECHNIQUE

CROSS REFERENCE TO RELATED APPLICATIONS

U.S. Provisional Patent Application No. 60-465096

STATEMENT REGARDING FEDERALLY SPONSORED RESEARCH OR DEVELOPMENT

Not Applicable

REFERENCE TO A MICROFICHE APPENDIX

Not Applicable

TECHNICAL FIELD

The technical field of the invention is data encoding and decoding for the purpose of resilience in the face of noise in digital data communication systems.

BACKGROUND ART

With the advent of the Internet it has become increasingly popular to transmit or broadcast digital data over wireless links. The use of any communication medium is constrained by Shannon's law, which states that the amount of information that can be transmitted is proportional to the bandwidth available. There is a limited amount of spectrum available that does not have undesirable characteristics—such as line of sight restrictions, or excessive attenuation in rain or fog. Typical approaches to reusing spectrum involve directional transmission/reception, use of low power cells, frequency hopping, or coding. While it is theoretically possible to transmit more than 1 bit/sec per Hertz of bandwidth (the unit is often abbreviated to "bits per Hz"), in practice this is often close to the designed-in ratio for many wireless data systems. However, the desire for broadband (high bit rate) connections is pushing the industry into exploring ways to increase this ratio and conserve on spectrum. For example, the IEEE 802.11a standard prescribes 64 QAM as the modulation technique in high bandwidth mode, which is equivalent to 6 bits/sec/Hz. The ability to increase this number is limited by the signal to noise (S/N) ratio at the receiver, as this affects the receivers ability to distinguish between the different symbols in the symbol constellation. The relationship is typically logarithmic, meaning that for every additional bit/sec/Hz we have to double the S/N ratio. The effect on a wireless system is to reduce coverage area, or increase the maximum required signal strength.

Another effect of the use of digital transmissions is that there is a very sharp cutoff—upto a certain point noise has no effect on the signal, but beyond a certain range the signal quickly becomes so garbled as to be completely useless. The sharpness of this cutoff is enhanced by the fact that many digital transmissions are organized into message blocks, and the whole block is discarded if any uncorrectable error is found. For digital TV broadcasts this is considered desirable, you either have a good picture or nothing. But for other types of uses this is undesirable; people browsing the Internet, emergency personnel or police might be willing to live with a slower or lower quality connection, but being cutoff completely is disastrous.

There is also another effect with high bits/sec/Hz digital systems—because the signal is pretty high above the noise floor at the cutoff range, there is a large zone beyond the cutoff range where reception at the same frequency of the transmitter is not possible. At 20 bits/sec/Hz this zone can be 400 times the area of the zone where reception is possible.

Compare this with an analog broadcast. As you get further and further from the transmitter, you lose clarity, but you can still recover significant amounts of information from the transmission. This does not require any coordination with the transmitter—it happens automatically. Many techniques have been implemented to adapt the rate of digital transmission to conform to a value suitable for adequate reception at the receiver, but all rely on negotiation between the transmitter and receiver. Moreover, while the low bitrate transmission is in progress, no other transmission can take place. For example, in 802.11a, one changes the modulation technique from 64 QAM all the way down to BPSK as the received SN ratio decreases.

REFERENCES

[1] U.S. Pat. No. 6,377,562 describes a primary application for this patent, as well as another method of accomplishing some of the objectives.

[2] U.S. Pat. No. 5,590,403 describes a system for communication between a central network and mobile units.

[3] "The Capacity of Downlink Fading Channels with Variable Rate and Power" by Andrea Goldsmith published in IEEE Transactions in Vehicular Technology, Vol 46, No 3, August 1997 compares the capacity of various modulation techniques, and in particular shows the advantages of "superposition coding with successive decoding".

BRIEF SUMMARY OF THE INVENTION

The object of the invention is to provide a encoding/decoding technique that allows digital broadcast transmissions to also have a failsoft capability, i.e. as the amount of noise or range increases, the bit rate decreases without completely losing the link. In particular, when used in a wireless environment, nearby receivers get access to the full bit rate, while far away receivers get a bit rate compatible with the S/N ratio at the receiver. In addition, nearby receivers can continue to get data while transmission to a far away receiver is in progress, losing only the bit rate used for the remote receiver.

The key idea behind the invention is the fact that a fixed level of noise does not limit the receivers ability to distinguish between any pair of symbols in the constellation, only between some pairs. This, if we can find (or create) groups of symbols for which the receiver will stay within the group for certain levels of noise (i.e. it will not be confused about which group the symbol belongs to), then we retain some information about what the original symbol was. If we can arrange these groups in a hierarchy of "non-confusable" groups for different noise levels, then we can create a labelling system for each symbol where the most significant bits of the label are accurate for a particular level of noise. If we then send messages using only bits of the same significance, then for a particular received S/N ratio, all messages encoded with sufficiently significant bits will be accurate, while those the employ less significant ones will not. We will be able recover a significant fraction of the messages, instead of losing practically all of them. In effect, the system creates an additional dimension within which to create transmission channels besides the familiar ones of time, frequency, space, and code. Another way of thinking about the effect of the coding employed by this invention is that while the BER for any particular receiver for both conventional coding and this one are the same, the message error rate is lower. This happens because we concentrate all the bad bits into some subset of the messages, and so the remaining messages still get through unaffected. This is the exact opposite of what IEEE 802.11 tries to do—they deliberately scramble the order of the bits to prevent a long run of bad bits.

This technique can be applied to any modulation technique that has a symbol constellation of 4 or more symbols. What is required is that the effect of standard noise on the receivers ability to distinguish between each pair of symbols in the constellation be studied and mapped, and then the symbols be organized into the hierarchical groups. It may be necessary to omit some symbols from the constellation allowed by the modulation technique to ensure that the groups are disjoint.

What distinguishes this system from other systems providing rate adaptive capability, is that the transmission of messages to receivers with different received S/N ratios can happen simultaneously. In a data broadcast situation, a transmission to a receiver with a low S/N ratio does not block transmissions to receivers with higher S/N ratios, it merely slows them down by the fraction of the available bit rate being used by the low received S/N ratio transmission. Compare this with the situation in 802.11a—a transmission to a far away receiver prevents transmission to nearby receivers; and since this is a slow transmission, the medium may be blocked for a while. During the transmission to a far away receiver, only 1 bit/sec/Hz gets transmitted instead of 6. In this system, the far away receiver would get 1 bit/sec/Hz, while the nearby receiver would get only 5 bits/sec/Hz—but the transmitter has not slowed down at all.

DETAILED DESCRIPTION OF THE INVENTION

Figure 1:
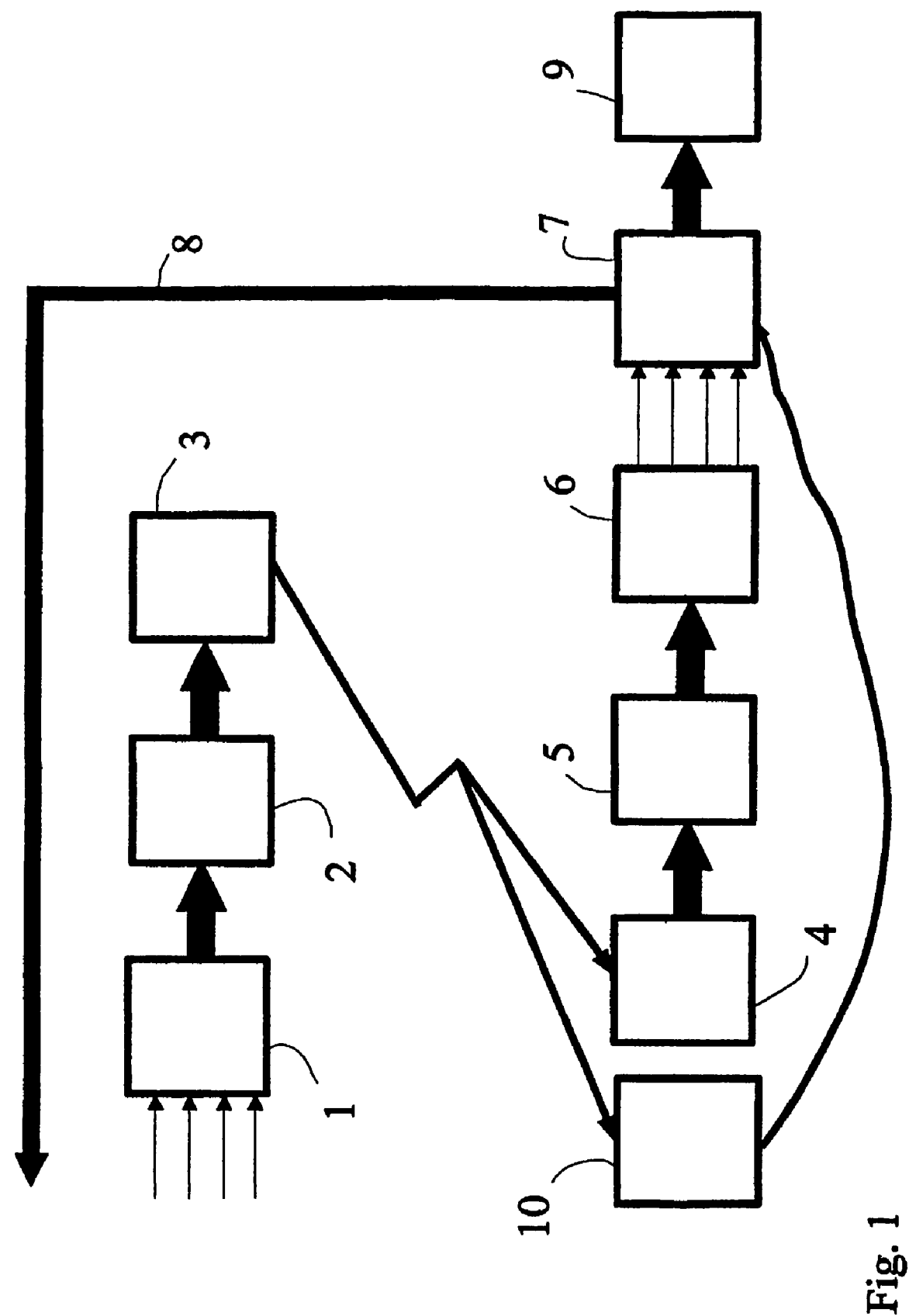
FIG. 1 shows a general diagram of the invention. A multiplexor 1 takes 1 bit from each message and combines them into a symbol label. In some implementations, more than 1 bit per message could be combined into a symbol label. This is then converted into an analog symbol using the DA converter 2 and then used to modulate a carrier in the modulator 3. This is then transmitted to the demodulators 4, which regenerate the analog symbol, and the label is regenerated by the AD converter 5. The symbol label is fed to the demultiplexor 6, which outputs each bit of the label as the next bit of the corresponding message. When a message is complete it is transferred to the checker 7, which verifies (using techniques such as a checksum or MD5 hash) that it has been received without errors. If so, the message may be acknowledged via a some back channel 8, and the message is passed to the ultimate receiver 9. An optional SN ratio measuring circuit 10 provides additional information to the checker so that it does not attempt to verify unusable channels. Note that the checking and acknowledgement are currently already performed by the IP subsystem of current computer systems.

In the example embodiment, the modulation format considered will be AM (amplitude modulation), although the techniques can be obviously be applied to other modulation formats. The signal to noise ratios for this modulation format will be voltage based (rather than power based).

An eight bit word can label all of the symbols in 256 AM, which are essentially 256 equally spaced voltage levels. A classic 8-bit DA converter can be used as the DA converter 2. Assuming perfect DA and AD converters, if the signal to noise ratio is 256, then the receiver will confuse only adjacent symbols. Imperfections in the converters can also be treated like noise. If the signal to noise ratio is 2 (3 db), the receiver will confuse a symbol with symbols upto 127 levels away. In either case, since we cannot divide them into two non-confusable groups, we cannot be assured about the correctness of any bit in the label.

We now arrange that we will never send a symbol that has 1 in the second most significant bit of the label. The allowed symbol space then becomes divided into two groups, one where the most significant bit of the label is 1 and the other where the most significant bit is 0, with a large gap in between. If the signal to noise ratio is more than 2 (3 dB), the receiver will always get the most significant bit of the label correct. Thus messages which are transmitted using only this bit will not have errors.

Note that in a normal 256 AM transmission each symbol would transmit 8 bits of the message; what we are requiring here is that multiple messages be sent simultaneously, with each symbol supplying one additional bit for each of the messages. In effect, we are creating multiple channels of transmission, with bit 0 of each symbol a part of channel 0, bit 1 of each symbol part of channel 1, etc. All the bits of messages in one channel have similar probabilities of being in error for a given SN ratio.

Let us now agree instead to not transmit the symbols with the labels 127 & 128. Again, the receiver will always get the most significant bit correct—but only if the S/N ratio exceeds 128 (12 dB). Note that even without the agreement, the accuracy of this bit would be in question for this signal to noise ratio only if the receiver produced 127 or 128 as the received symbol. In other words, if we had some way to estimate the SN ratio as being above 128 (12 dB), we could be confident about the value of this bit except when the receiver produced one of these two values. In fact, if the probability of these symbols being present in the input stream is low enough, this bit will be accurate often enough to get complete messages through the system, even if we do not delete these symbols from the allowed symbol space.

What we did when we agreed to not transmit a 1 in the second most significant bit was to divide the symbol space into two groups which could not be confused by the receiver in the presence of noise less than half the signal. Similarly, what we did when we agreed to not transmit symbols 127 & 128 was to divide the space into two non-confusable groups for noise less than $\frac{1}{128}$ of the maximum signal.

Taking this a step further, look at what happens when we agree not to transmit messages using the second and fourth most significant bits of the label. For SN ratios of 2 (3 dB) or more the most significant bit is always correct. For SN ratios of 8 (9 dB) or more the 3rd most significant bit is also always correct.

We can tailor the ramp down by choosing which bits to omit. For example, we could omit use of every third bit of the label. Then we would keep 6 bits, for SN ratios of 4 (6 dB), 32 (15 dB), and 256 (24 dB).

All of these are achievable with classical binary DA and AD converters. A ternary DA converter (one in which each bit is valued at 3 times the previous bit) driven by a binary signal provides us with a built in gap between symbol spaces. This can be used to achieve a SN ramp of 3 (4.99 dB) per bit.

If a high power standard symbol is broadcast repeatedly at regular intervals (such as the frame and line sync signals on a TV broadcast), the SN ratio can be estimated by a estimation circuit 10 and usable channels identified. This signal can also be used to set the gain of the receiver's AGC, just as a TV receiver would.

While such a signal would still be necessary to adjust the AGC, in fact the SN ratio estimation circuit is not strictly necessary. Techniques such as that used in PPP would delineate message boundaries. Generating and transmitting a hash signature (or checksum) for each message and comparing that with the computed hash signature (or checksum) of the received message can tell us with high probability whether the message was received correctly.

Obviously this can be extended to more than 8 bits per Hz—limited only by the precision with which the D-A and A-D conversion is accomplished. It can also be extended to modulation schemes other than AM, provided the probability of confusion of different symbols by the receiver is understood and the symbols can be grouped into hierarchical non-confusable groups based on signal to noise ratio (or almost so based on the probability of confusion).

This kind of system could be used in a digital broadcast situation, such as for digital TV, video and other data distribution, or even high bandwidth Internet access—where the back channel is accomplished via other means. The advantage of such a system is that instead of setting up multiple high bandwidth low power cell transmitters, one can set up a single high power high bandwidth transmitter, and then allocate channels within the SN space to receivers. It is especially well suited to supporting a situation where a large amount of data is periodically broadcast to and cached by a very large base of users, with varying levels of priority for updates for some data and users.

To give one an idea of the potential capabilities of such a system, a standard TV transmission is considered good if the SN ratio is about 60 dB. Using AM, you need about 3 dB to generate a bit of information about the power level of a symbol, thus you can get 20 bits/sec/Hz from a standard TV channel. Since a TV transmission uses about 6 MHz of bandwidth, theoretically you should be able to get at least 120 Mbits/sec within the protected area of a TV transmitter, if you can get your DA and AD converters precise enough. Let us say the transmitter is powered to the point where this performance is achieved upto a radius of 0.5 km (approximately 1 KW in practice).

Let us now consider where the next transmitter using the same channel (and power) can be located. Its signal needs to be 60 dB below the first transmitter. Since distance based attenuation is about 6 dB for each doubling of range, the second transmitter needs to be at least 2**10 times the 0.5 km, i.e. more than 500 km, away—or it would need to be out of the line of sight. If it were any closer, its transmissions would generate enough interference to cause a complete loss of data using current techniques of achieving 20 bits/sec/Hz. Secondly, beyond 0.5 km, the ambient noise would also cause a loss of data. In effect given these two transmitters, there can be no reception using the same spectrum in the region 0.5 km to 500 km from the transmitter.

However, upto 250 km away, at least 1 bit (the most significant bit) of each symbol would almost always be correct. Since in this invention, messages only use some of the bits of each symbol, any messages that used only that one bit would be received correctly. Thus, 250 km away, we would still be able to get upto 6 Mbit/sec of digital data to the receiver. Current systems recognize this problem and address it by changing the data rate for near and far receivers, and prefixing a rate header to let the receiver know what rate format is being used. In effect, sending the messages by the mechanism proposed here automatically turns the system into a 1 bit/sec/Hz system when the SN ratio demands it. But in addition, one does not have to stop transmitting the less significant bits, and one does not need the rate header, so the same transmitter communicates more information to the same area, with the same power.

Let us now consider what happens when we use a 1 W transmitter like the one allowed by the FCC for unlicensed transmissions in the 5.875 Ghz U-NII band. The range for this is dependent on the ambient noise and terrain, but IEEE 802.11a specification considers −65 dbm received power to be sufficient to receive 6 bits/sec/Hz, so −23 dbm should be sufficient to receive 20 bits/sec/Hz. A 6 Ghz with standard dipole antennas, this can be achieved when closer than about 2.8 m (8.5 ft). At 28 m we can do 13 bits/sec/Hz, at 281 m we can do 6 bits/Hz, and at 2.8 km we can do 1 bit/sec/Hz. Each 802.11a channel consists of 48 channels running at 250K symbols/sec, for a total of 12M symbols/sec. Because of the need for error correction, and the limitation of 6 bits/sec/Hz, IEEE 802.11a tops out at 54 Mbits/sec, and to achieve this rate the furthest receiver would have to be less than 281 m away (6 bits/sec/Hz). Assuming the system that uses every alternate bit, i.e. one usable bit every 6 dB, this invention would simultaneously allow 12 Mbits/second upto 1.7 km away, 12 Mbits/sec upto 850 m, 12 Mbits/sec upto 425 m, 12 Mbits/sec upto 212 m, 12 Mbit/sec upto 106 m (total is now 60 Mbit/sec), and so on as we get closer.

This system is dependent on the quantization of the transmitted signal, with only the noise being allowed to have a continuous range of values. Thus its best application is when one transmitter is broadcasting information to multiple receivers—not when multiple transmitters are receivable at one receiver. Of course if the transmitters do not operate simultaneously and the AGC can react fast enough, or for each receiver all except one transmitter are sufficiently faint to be considered noise, then it is still usable.

BEST MODE FOR CARRYING OUT THE INVENTION

In the preferred embodiment, an RF transmitter operating in a TV channel is fed a baseband signal from a 20 bit DA converter. This D-A converter is fed 20 bit words, and must produce an output that is precise to one part in a million. Video cards today can easily accomplish this—the current standard is pixels with 24 bit color on screens with 1024×768 pixels, and can go as high as 2048×1024 pixels. One specifies the color and intensity of each pixel with 8 bits each for red, green, and blue. On the receiver side, a high quality receiver feeds its baseband output to a AD converter—such as a video capture card. Here again, 24 bit video capture cards already exist, and will copy the digital output directly to memory. This is now a system that copies (with some errors) the contents of the video memory on the transmitter to the memory designated to receive the video capture on the receiver.

One implementation could choose to stay within the NTSC B&W video limits. On an NTSC system one would have approximately 15750 lines per second, 14400 of which are usable. To stay within the video bandwidth limit and to support the blanking interval each line will actually carry only 100 data symbols—each of which is 20 bits deep. Since video cards produce upto 720 datapoints (pixels) per line, the code must compute the pixel values on the transmitter by interpolation, and similarly the original symbols must be recovered—again by interpolation at the receiver.

One now applies the techniques of the patent. Instead of treating each symbol as 20 bits of a message, each symbol is treated as the combination of bits from upto 20 messages. If we were combining 20 messages, each bit of the symbol would come from one bit of each message. In the above mentioned NTSC based system, each frame of such a system would support 9600 data blocks of 100 bits each. The total bit rate would be 28.8 Mbits/sec, with each channel getting about 1.44 Mbits/sec. Messages intended for far away receivers would be assigned to the bits in each symbol least susceptible to noise (for example, the most significant bit of each color), while messages intended for nearby receivers would be assigned to more susceptible bits. Any error detection and correction bits would be computed for each message separately, and would use the same bits in their symbols as their message. One can consider each bit of a symbol to be part of a different channel. Thus bit 0 of every symbol is part of channel 0, bit 1 of every symbol is part of channel 1, bit 2 of every symbol is part of channel 2 etc.

On the receive side each line is split up into 20 data blocks (or however many were prearranged). If necessary, corresponding data blocks on multiple lines are combined to form messages. Each message is separately checked for errors and thrown away if uncorrectable. Every now and then the receiver informs the transmitter via some other medium (such as a dialup connection) of the error statistics on each channel, which allows the transmitter to select the optimum channel for each outgoing message.

This kind of system can even support fractional bit/Hz. One simply allows the message to repeat at the same spot in the "frame". If the receiver gets too many errors on a channel, it sums frames with high correlations in that channel, and applies the technique again. Since the transmitter knows which channels are having high error rates for a particular receiver, or simply knows a priori which channels are likely to have high error rates, it can simply retransmit messages to that receiver on multiple consecutive frames on that channel. On a regular analog TV system, ghosts due to multipath refections are not eliminated by such an averaging process; however, since each channel carries uncorrelated messages and the higher channels have less repeats, on this system ghosts would also tend to get suppressed.

This embodiment is regarded as best only in that it can be built quickly using off-the shelf parts. A custom system could expand the bandwidth allocated to the video intensity, and omit all other details of the TV system except for the frame synchronization mark. Other systems could use modulation other than AM, provided the effect of noise on the probability of a receiver confusing pairs of symbols in the constellation is understood.

I claim the following:

1. A digital broadcast system with increased probability of a whole message being successfully transmitted, comprising;
   a multiplexor to combine one or more bits from multiple messages into a digital symbol, so each symbol has bits from multiple messages;
   a DA converter, which could be comprised of a separate DA converter and an RF modulator, that converts the digital symbol into an analog symbol;
   an AD converter, which could be comprised of a separate RF demodulator and AD converter, that converts the analog symbol back into a digital symbol;
   a demultiplexor that recreates each message from corresponding parts of multiple digital symbols;
   wherein the symbols transmitted by the system between the multiplexor and demultiplexor are selected from a hierarchy of non-confusable groups; and
   wherein the "hierarchy of non-confusable groups" is a hierarchical grouping of the symbols, created as follows:
   a. find groups of symbols for which the receiver will not be confused about which group the symbol belongs to, for certain levels of noise;
   b. arrange the groups into a hierarchy by noise level; and wherein
   i. the analog symbols are labelled with a digital symbol composed of multiple parts or bits, such that each bit of the label makes a choice at a particular level of the hierarchy, wherein
   ii. the more significant bits are defined as those bits that make a choice at higher levels of the hierarchy;
   iii. with the result that when using digital symbols with binary bits all the symbols with 1 in the most significant bit are in one top level group, the symbols with 0 in the most significant bit are in the other top level group, and the most significant bit specifies which group of the groups in the top level of the hierarchy the symbol is in;
   iv. the next most significant bit splits each top level group as in iii, and together these two bits specify which group of all the groups in the second level of the hierarchy the symbol is in;
   v. and this group splitting is applied recursively with each succeeding bit until using all the bits including the least significant bit specifies which group of the groups in the lowest level of the hierarchy the symbol is in;
   and wherein each message is transmitted using bits of the label having the same significance in every symbol sent to transmit the message.

2. To increase the probability ore whole message being successfully transmitted, the system of claim 1:
   where some portions of the symbol label are deliberately left unused, acting as guard bands to prevent messages using the less significant bits from interfering with messages using the more significant bits.

3. To increase the total data rate successfully transmitted, the system of claim 2:
   where different receiver; are grouped into groups with different received S/N ratios;
   where transmissions to receivers in groups lower S/N ratios are done by using the more significant bits and transmissions to receivers in groups with higher S/N ratios are done by using the less significant bits.

4. To increase the probability or high priority messages being received correctly, the system of claim 2:
   where higher priority messages are san using the more significant bits, and lower priority messages are sent using the less significant bits.

* * * * *